US010162489B2

(12) United States Patent
Lee et al.

(10) Patent No.: US 10,162,489 B2
(45) Date of Patent: Dec. 25, 2018

(54) MULTIMEDIA SEGMENT ANALYSIS IN A MOBILE TERMINAL AND CONTROL METHOD THEREOF

(71) Applicant: LG ELECTRONICS INC., Seoul (KR)

(72) Inventors: Kang Lee, Seoul (KR); Hyangseok Chae, Seoul (KR); Kwonseung Yang, Seoul (KR); Suyeon Kim, Seoul (KR); Heesoo Kang, Seoul (KR); Eunkyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 14/490,141

(22) Filed: Sep. 18, 2014

(65) Prior Publication Data

US 2015/0128044 A1 May 7, 2015

(30) Foreign Application Priority Data

Nov. 4, 2013 (KR) .................. 10-2013-0133209

(51) Int. Cl.
*G06F 3/0484* (2013.01)
*H04N 5/225* (2006.01)
*H04N 5/232* (2006.01)
*G06F 3/0481* (2013.01)
*G06F 17/30* (2006.01)

(52) U.S. Cl.
CPC .......... *G06F 3/0484* (2013.01); *G06F 3/0481* (2013.01); *G06F 3/04847* (2013.01); *G06F 17/30796* (2013.01); *G06F 17/30852* (2013.01); *H04N 5/2258* (2013.01); *H04N 5/23293* (2013.01)

(58) Field of Classification Search
CPC .......... G06F 17/30796; G06F 3/04847; G06F 17/30852; G06F 3/0484; G06F 3/0481; H04N 5/2258; H04N 5/23293
See application file for complete search history.

(56) References Cited

U.S. PATENT DOCUMENTS

| 8,745,683 | B1 * | 6/2014 | Maeng ................. H04N 21/435 725/110 |
| 2002/0163532 | A1 * | 11/2002 | Thomas ............ G06F 17/30814 715/723 |
| 2008/0055272 | A1 * | 3/2008 | Anzures ................ G06F 1/1626 345/173 |
| 2012/0221330 | A1 * | 8/2012 | Thambiratnam ....... G10L 25/84 704/235 |

(Continued)

*Primary Examiner* — William L Bashore
*Assistant Examiner* — Daniel W Parcher
(74) *Attorney, Agent, or Firm* — Ked & Associates, LLP

(57) ABSTRACT

A mobile terminal and a method for controlling the same are disclosed. The mobile terminal includes a display and a controller configured to display at least one piece of video content on the display, to extract at least one text from at least one of an image and sound included in at least a portion of the video content and to display the at least one text on at least one specific position of the display, wherein the at least one specific position is related to at least one point of the video content, from which the at least one text is extracted. According to the present invention, video content can be manipulated more conveniently by displaying images and sound included in the video content as text.

8 Claims, 22 Drawing Sheets

(56) References Cited

U.S. PATENT DOCUMENTS

| | | | | |
|---|---|---|---|---|
| 2013/0042283 A1* | 2/2013 | Begeja | ............... | H04N 7/17318 |
| | | | | 725/93 |
| 2013/0191415 A1* | 7/2013 | Ambwani | ......... | G06F 17/30029 |
| | | | | 707/770 |
| 2013/0236073 A1* | 9/2013 | Piratla | ............... | G06K 9/00979 |
| | | | | 382/128 |
| 2013/0343727 A1* | 12/2013 | Rav-Acha | ............... | G11B 27/28 |
| | | | | 386/282 |
| 2014/0105573 A1* | 4/2014 | Hanckmann | ....... | G06K 9/00718 |
| | | | | 386/241 |
| 2014/0258472 A1* | 9/2014 | Shirey | ................ | H04L 67/2804 |
| | | | | 709/219 |
| 2015/0063780 A1* | 3/2015 | Shintani | ................ | G11B 27/32 |
| | | | | 386/241 |
| 2015/0074700 A1* | 3/2015 | Danovitz | ........... | H04N 21/4826 |
| | | | | 725/14 |
| 2016/0155001 A1* | 6/2016 | Betley | ................ | H04N 21/8549 |
| | | | | 725/116 |

\* cited by examiner

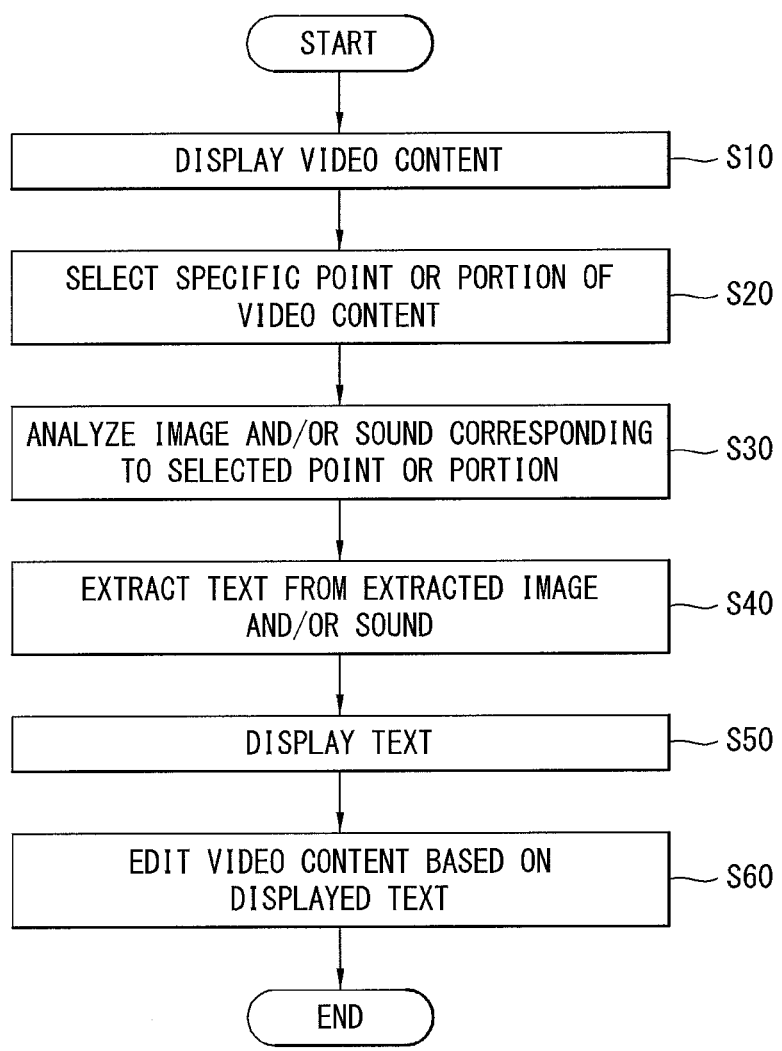

FIG. 4
(a)
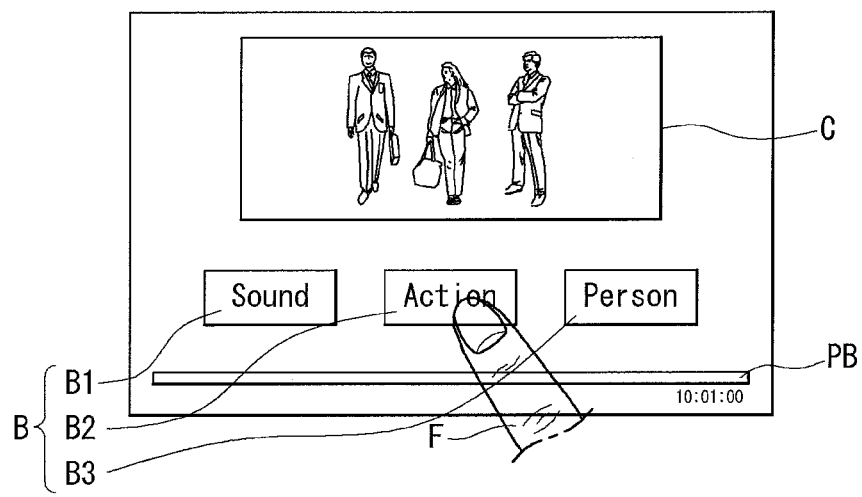
(b)
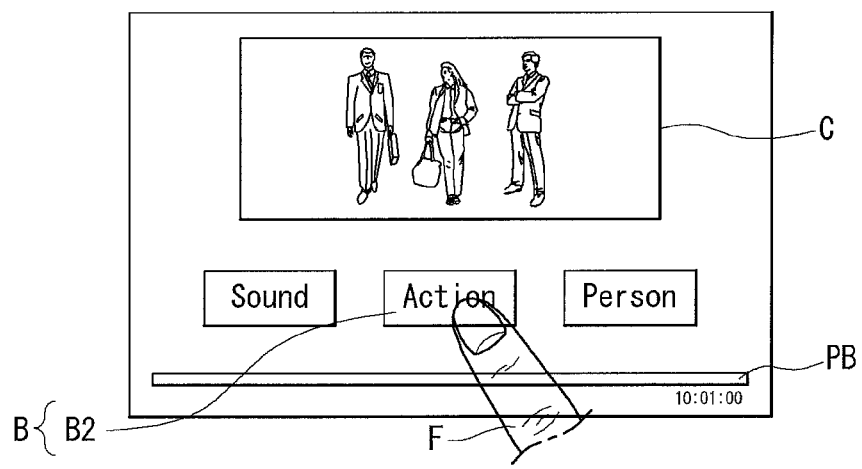

FIG. 5
(a)
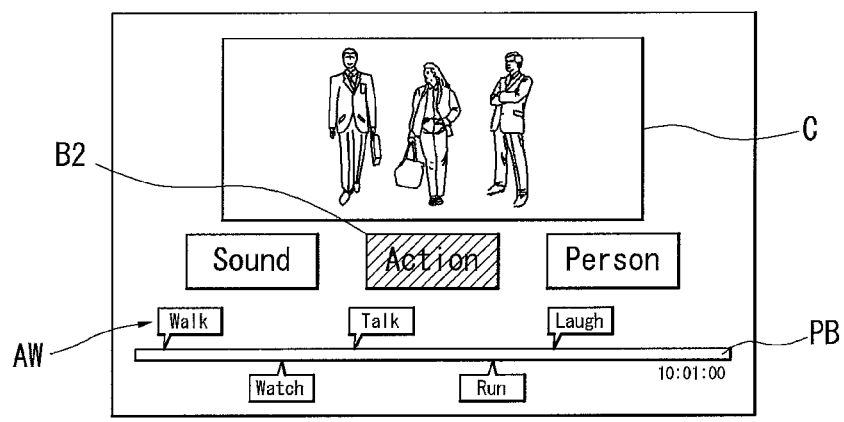
(b)
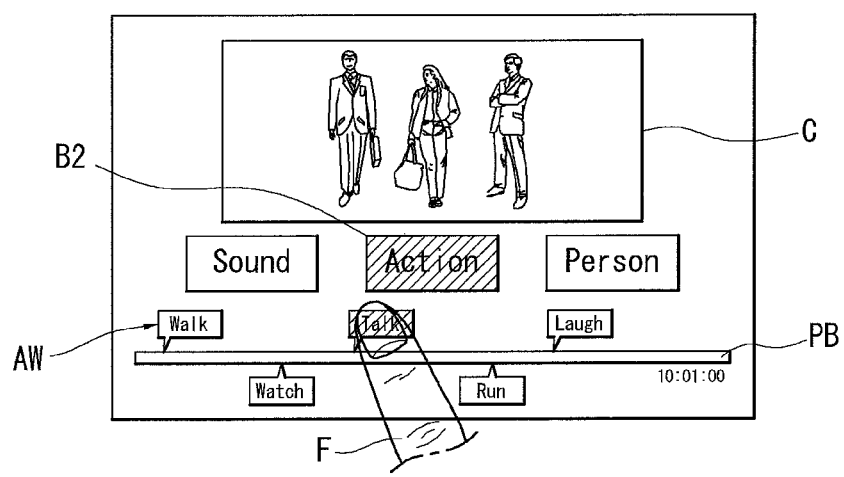

FIG. 6
(a)
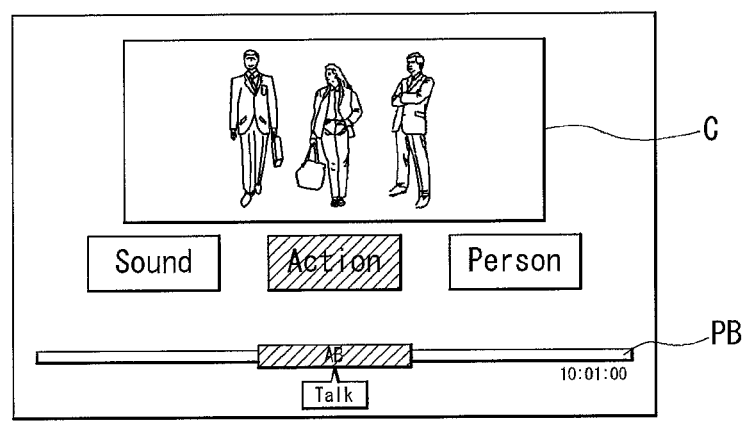
(b)
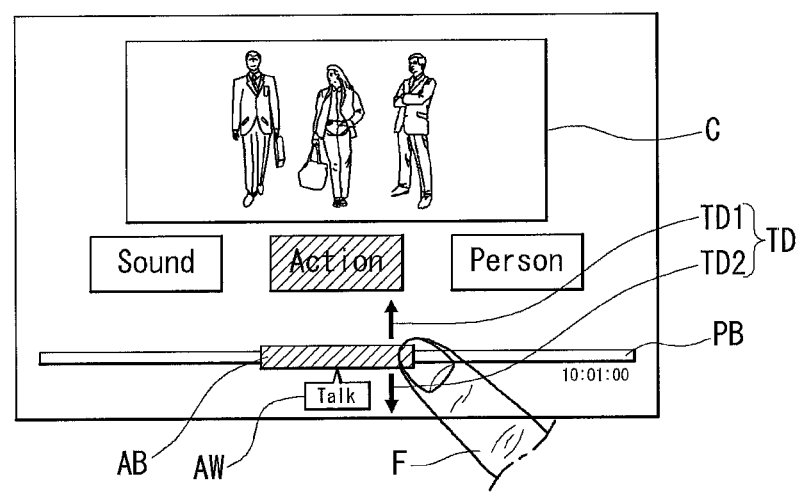

FIG. 7
(a)
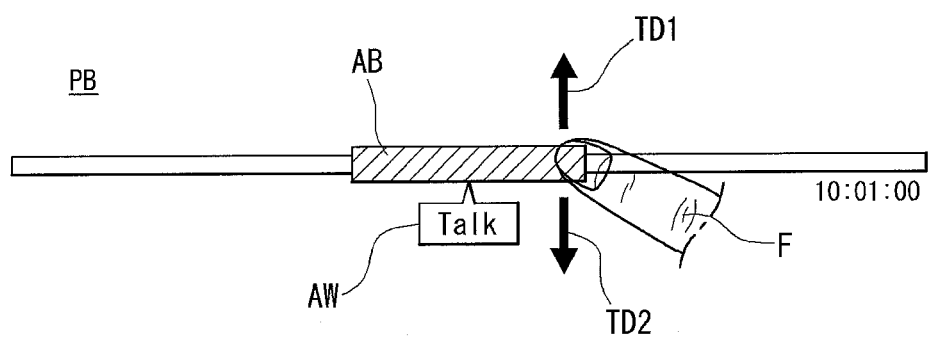
(b)
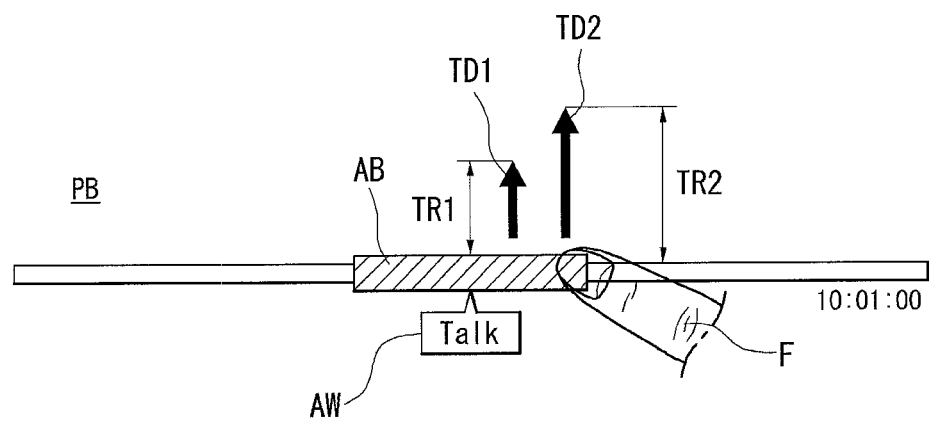

FIG. 8
(a)
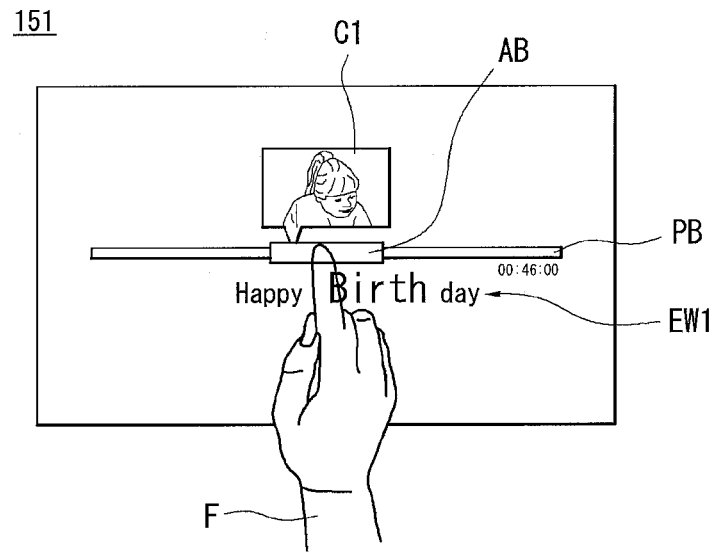
(b)
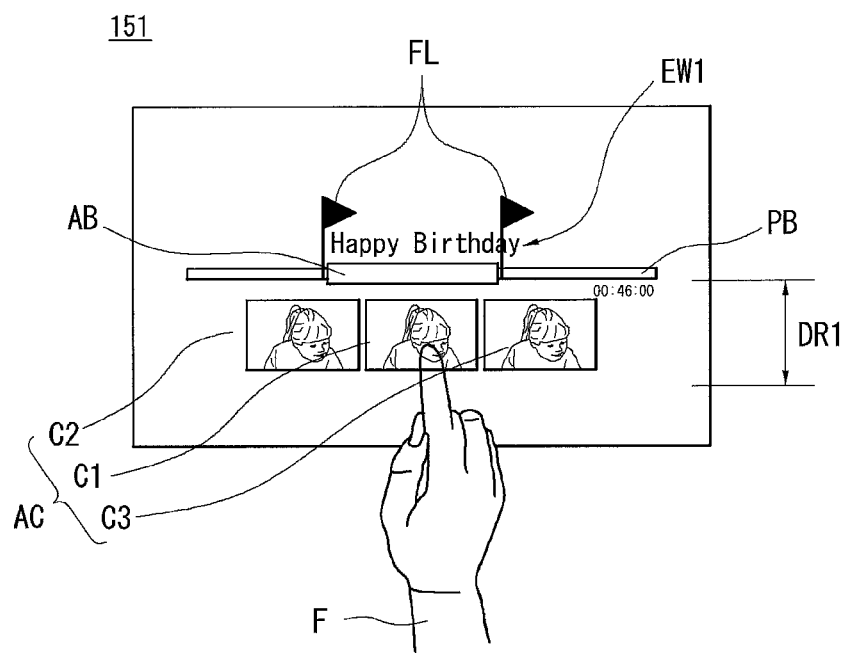

FIG. 9
(a)
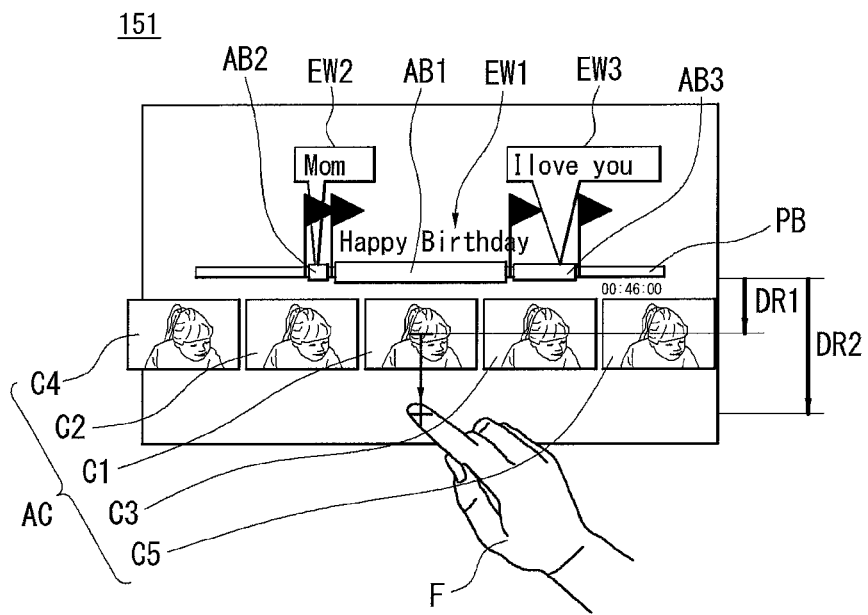
(b)
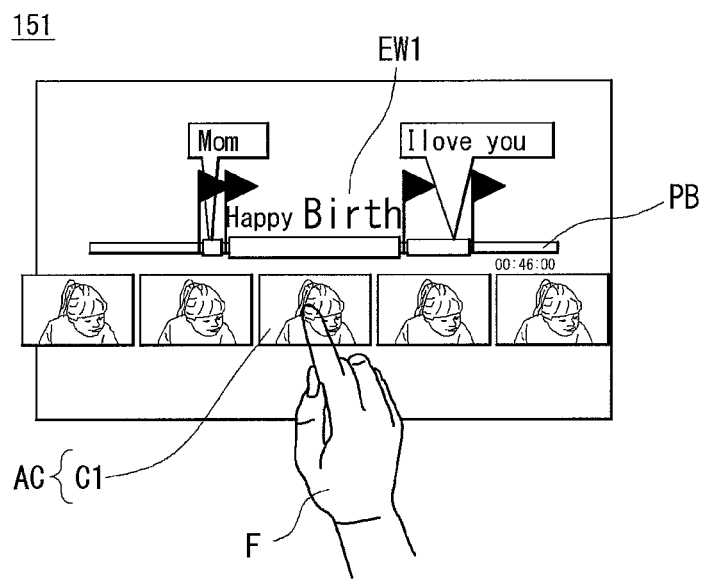

FIG. 12
(a)
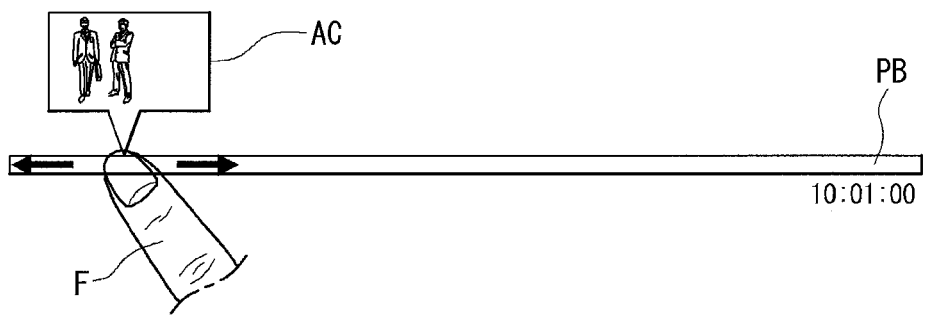
(b)
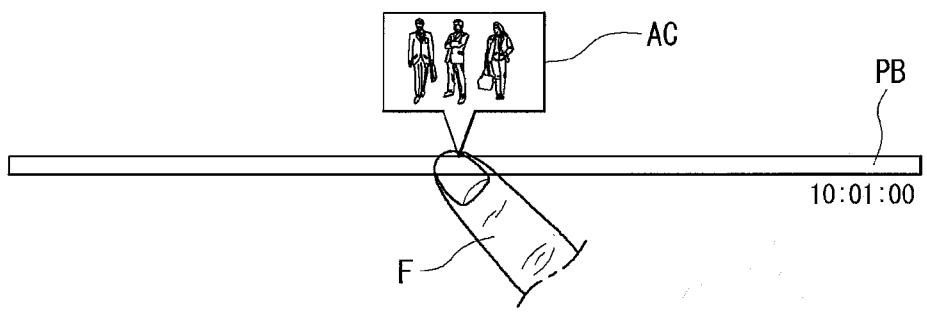
(c)
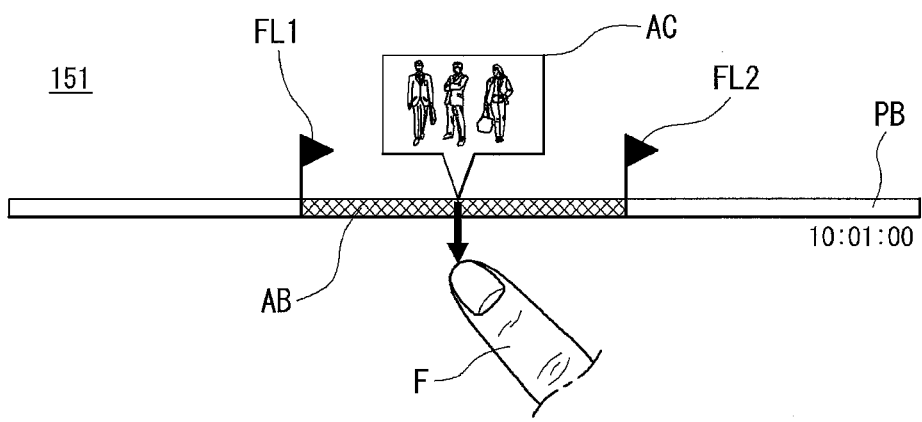

FIG. 13
(a)
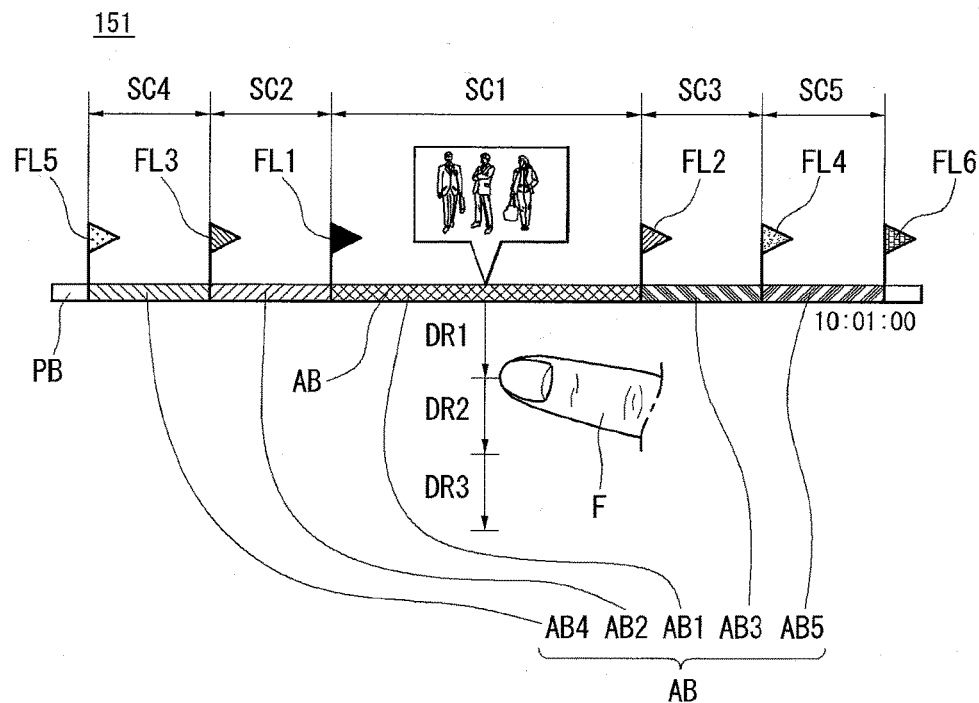
(b)
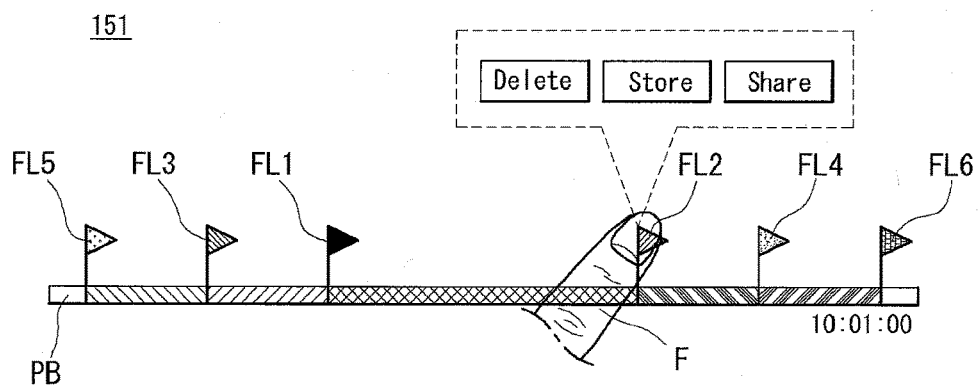

FIG. 14
(a)
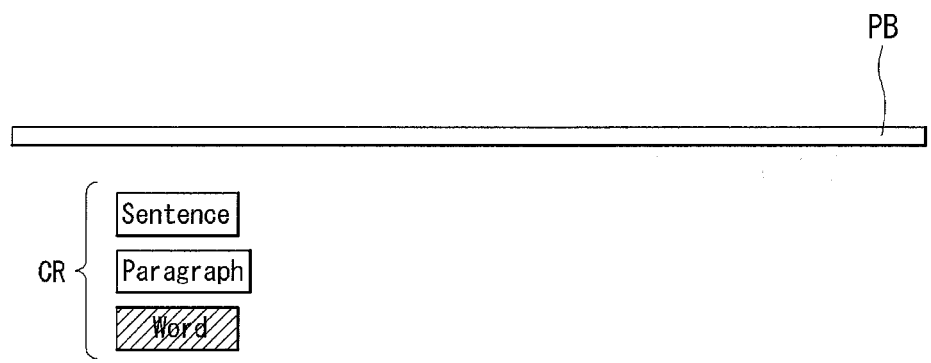
(b)
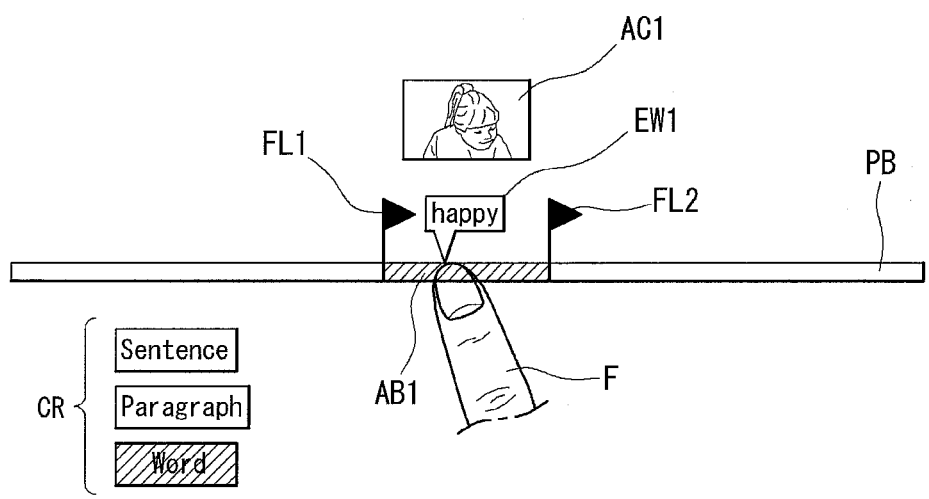

FIG. 15
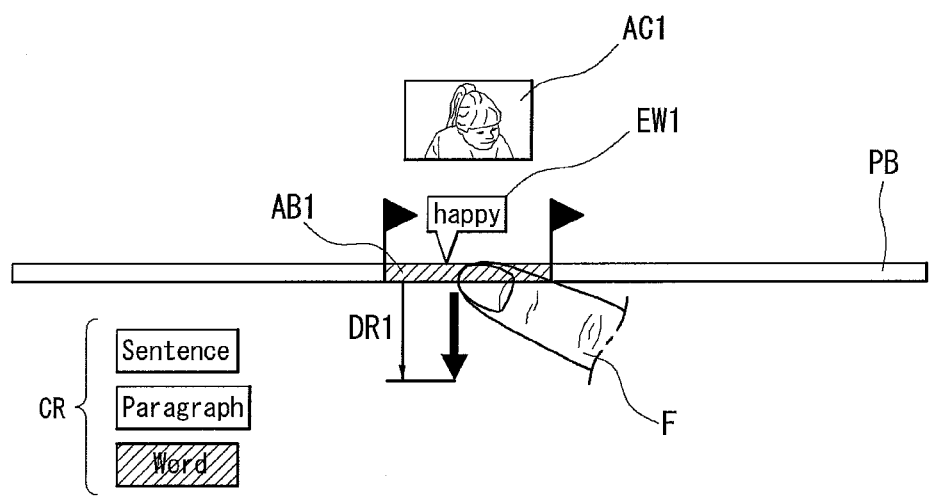
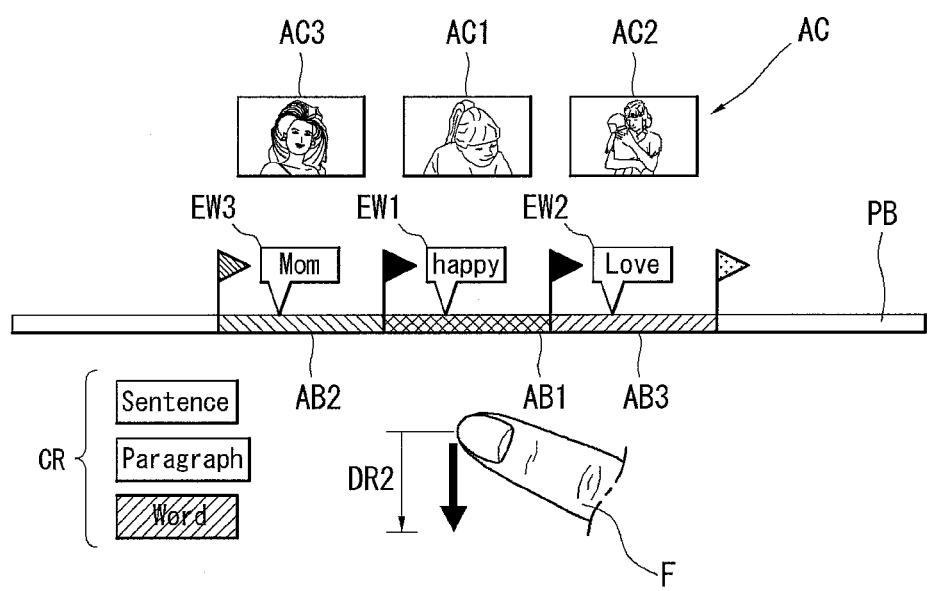

FIG. 17
(a)
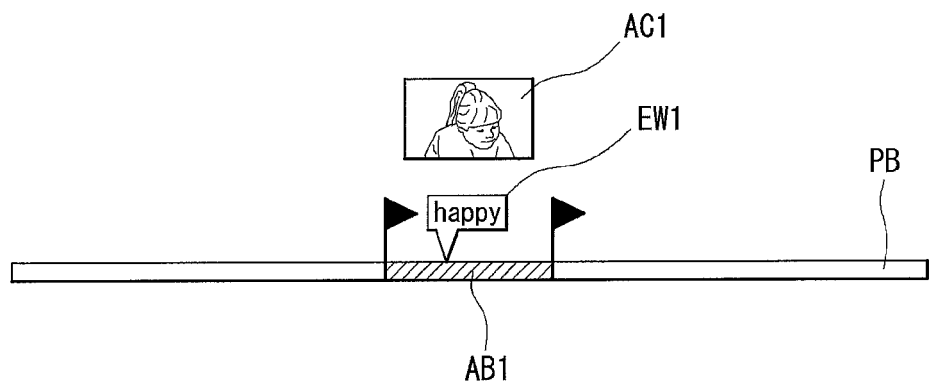
(b)
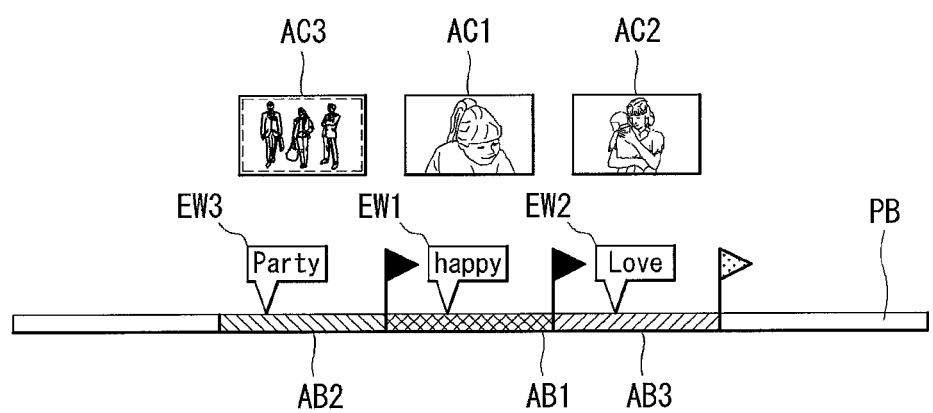

FIG. 18
(a)
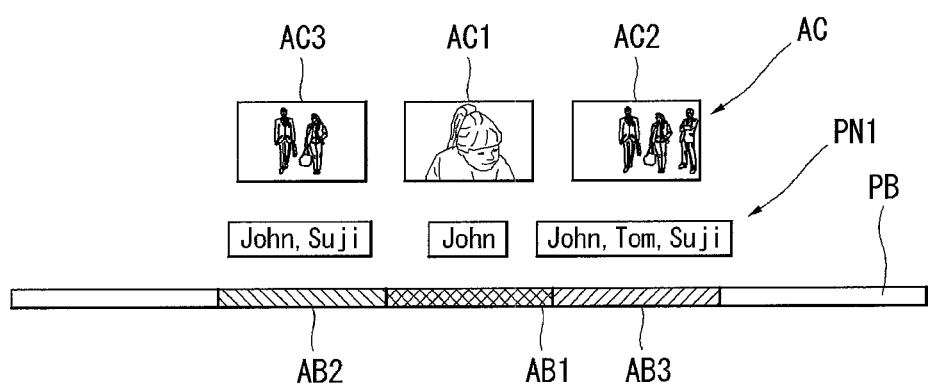
(b)
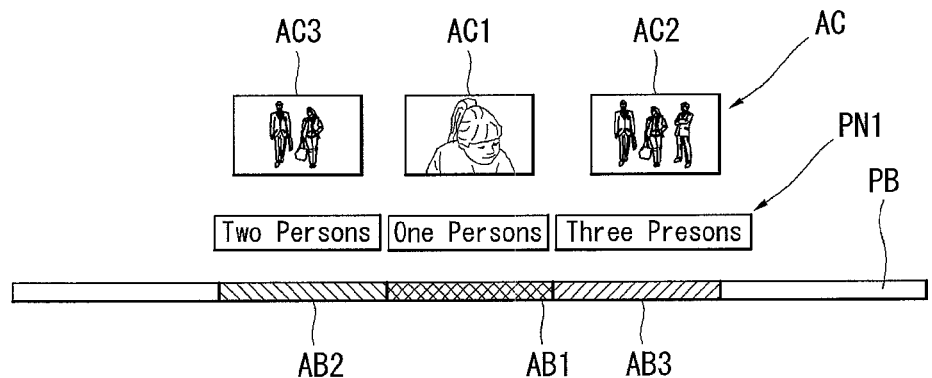

FIG. 19
(a)
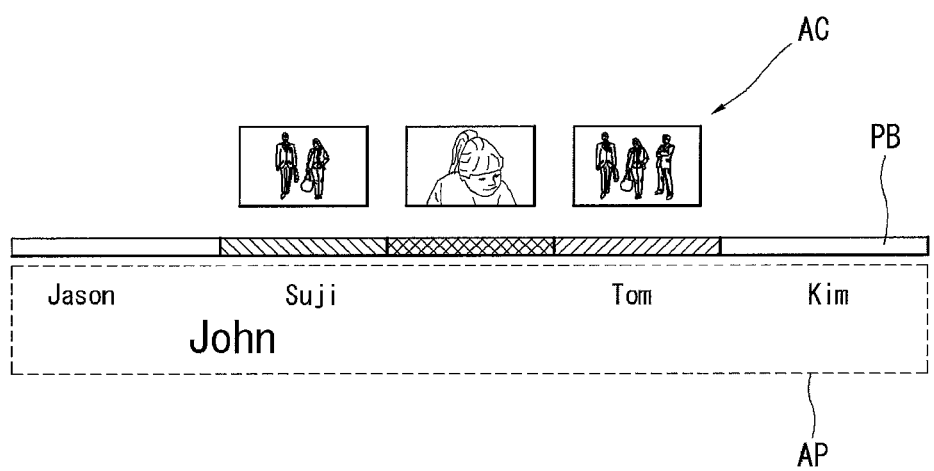
(a)
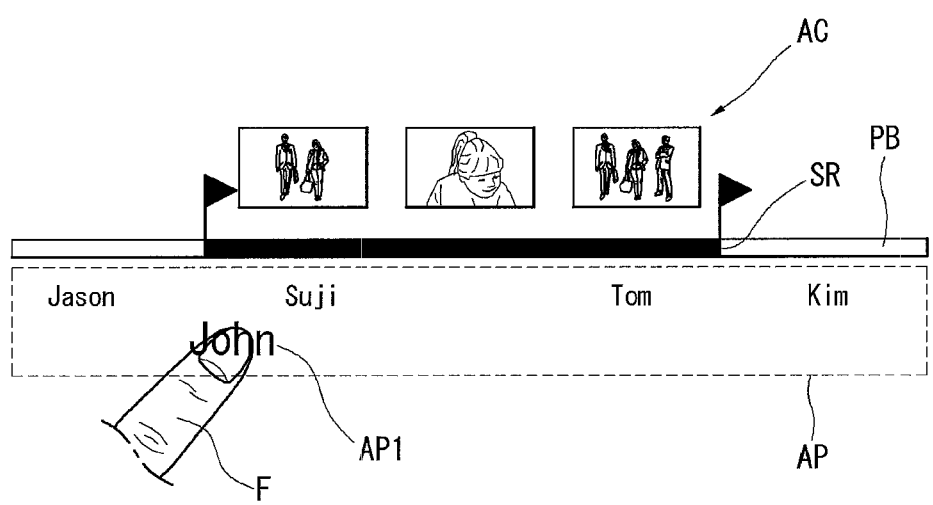

MULTIMEDIA SEGMENT ANALYSIS IN A MOBILE TERMINAL AND CONTROL METHOD THEREOF

CROSS-REFERENCE TO RELATED APPLICATION(S)

Pursuant to 35 U.S.C. § 119(a), this application claims the benefit of earlier filing date and right of priority to Korean Patent Application No. 10-2013-0133209, filed on Nov. 4, 2013, the contents of which are incorporated by reference herein in their entirety.

BACKGROUND

1. Field

The present invention relates to a mobile terminal and, more specifically, to a mobile terminal capable of manipulating video content more conveniently by displaying images and sound included in the video content as text and a method for controlling the same.

2. Background

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY

An object of the present invention is to provide to a mobile terminal capable of manipulating video content more conveniently by displaying images and sound included in the video content as texts and a method for controlling the same.

BRIEF DESCRIPTION OF THE DRAWINGS

The embodiments will be described in detail with reference to the following drawings in which like reference numerals refer to like elements wherein:

FIG. 3 is a flowchart illustrating an operation of the mobile terminal shown in FIG. 1;

FIGS. 4 to 7 illustrate the operation of the mobile terminal shown in FIG. 3;

FIGS. 8 to 11 illustrate the operation of the mobile terminal shown in FIG. 3, according to another embodiment of the present invention;

FIGS. 12 and 13 illustrate the operation of the mobile terminal shown in FIG. 3, according to another embodiment of the present invention;

FIGS. 14 to 16 illustrate the operation of the mobile terminal shown in FIG. 3, according to another embodiment of the present invention;

FIG. 17 illustrates the operation of the mobile terminal shown in FIG. 3, according to another embodiment of the present invention;

FIGS. 18 and 19 illustrate the operation of the mobile terminal shown in FIG. 3, according to another embodiment of the present invention;

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
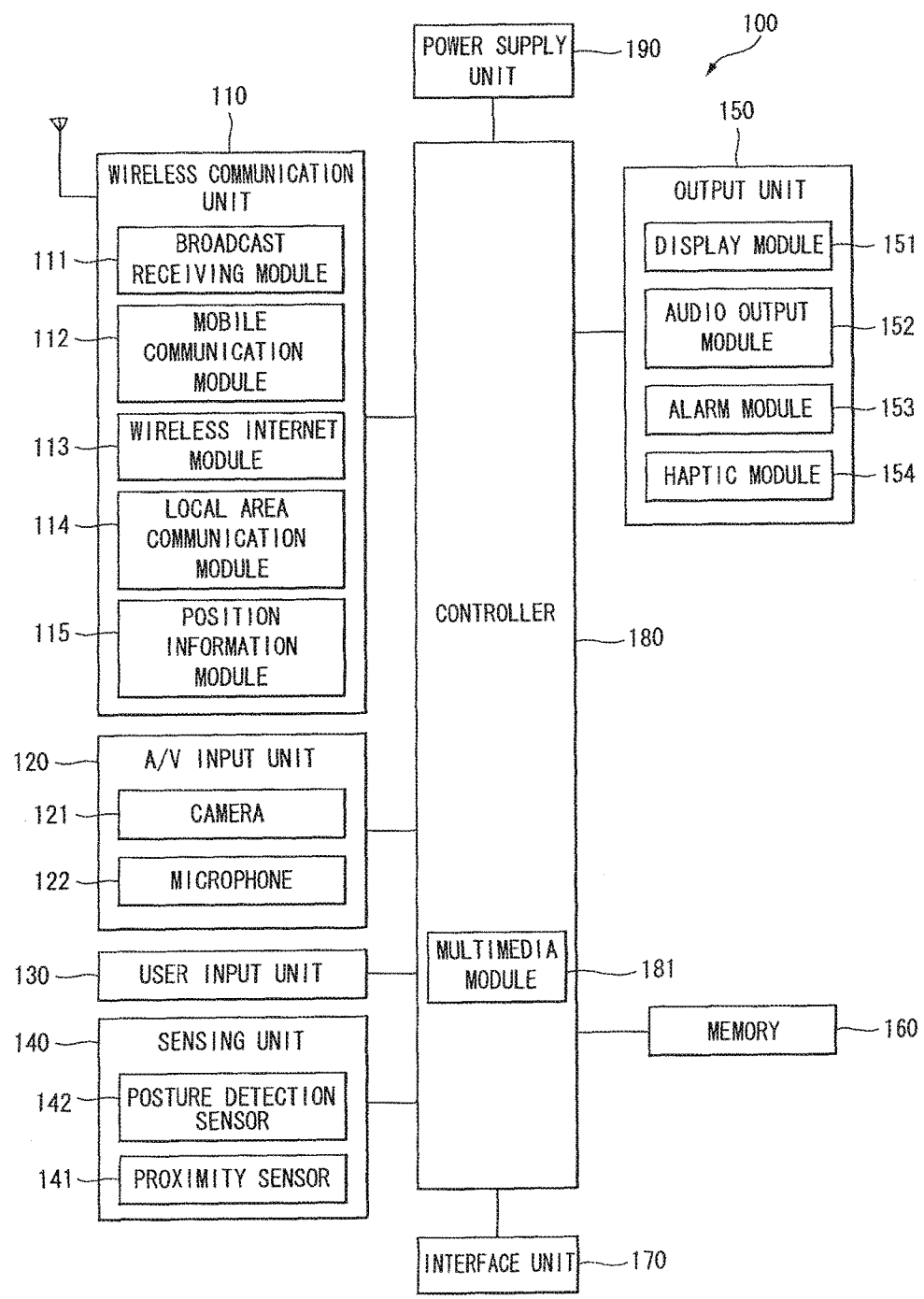
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZigBee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touchscreen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100. The sensing unit 140 may also include a posture detection sensor 142.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touchscreen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touchscreen, and/or near the touchscreen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touchscreen may be constructed such that proximity of a pointer is detected through a variation in an electric field according to the proximity of the pointer. The touchscreen (touch sensor) may be classified as a proximity sensor 141.

For ease of explanation, an action of the pointer approaching the touchscreen without actually touching the touchscreen may be referred to as a proximity touch and an action of bringing the pointer into contact with the touchscreen may be referred to as a contact touch. The proximity touch point of the pointer on the touchscreen may correspond to a point of the touchscreen at which the pointer is perpendicular to the touchscreen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touchscreen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk.

The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touchscreen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
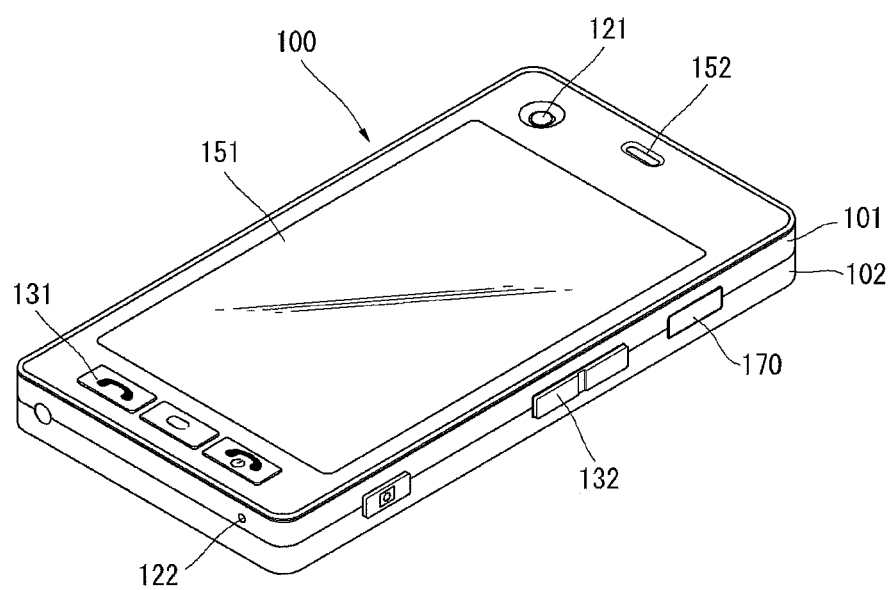
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
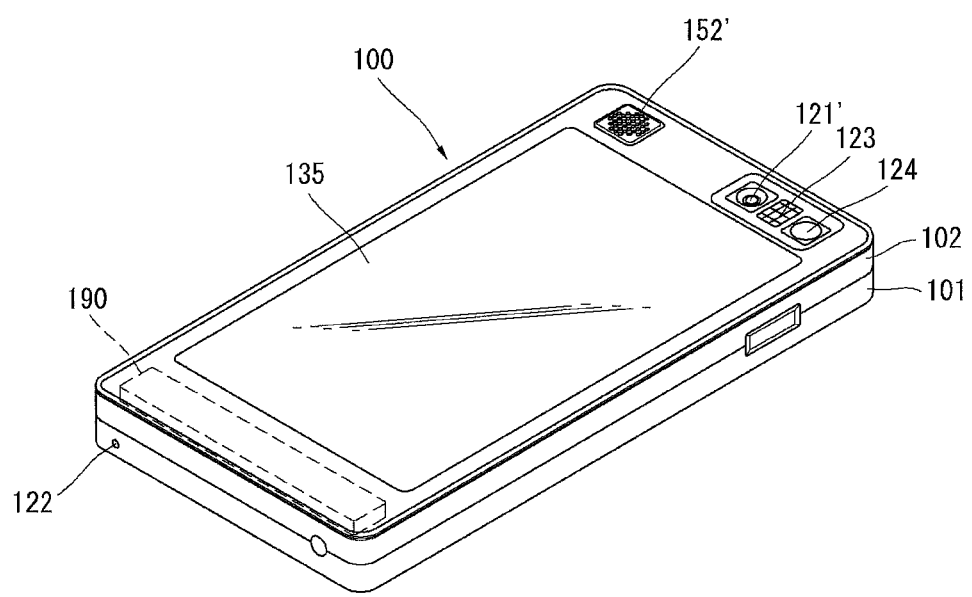
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touchscreen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

FIG. 3 is a flowchart illustrating an operation of the mobile terminal 100 shown in FIG. 1.

As shown, the mobile terminal 100 according to an embodiment of the present invention may extract text from sound and/or an image included in video content and display the text on the display 151.

Specifically, the controller 180 may display the video content in step S10.

The video content may be data including images of an action. The video content may include sound along with the image. For example, the video content may include both the image and sound or include only the image. Otherwise, at least a portion of the video content may not include sound.

The controller 180 may receive an input of selecting a specific point or section of the video content in step S20.

A user may select a specific point or section of the video content. For example, the user can select a specific point or section of video content during playback or video content ready to be played.

The user may select the specific point of section of the video content by touching a progress bar, which indicates play time or state of the video content, with a finger or the like. The user may select the specific point or section of the video content by touching a specific point of the progress bar and dragging in a specific direction. The specific point or section of the video content may be selected by a control signal of the controller 180 on the basis of a specific time and/or criterion.

The controller 180 may analyze images and/or sound corresponding to the selected specific point or section in step S30 and extract text from an extracted image and/or sound in step S40.

The video content is data including images and the images may include sound, as described above. The controller 180 can analyze the images and/or sound included in the video content. The controller 180 can extract text from an extracted image and/or sound.

Extraction of text from an image may be performed in the following manner. For example, an image may include a plurality of persons. The controller 180 may detect the number of persons corresponding to a specific point of the image. The controller 180 can extract text from the detected number of people. For example, text of "three people" can be generated. In addition, the controller 180 may detect the name of a person corresponding to a specific point of the image. That is, the controller 180 can detect the name of a person corresponding to a specific point of the image by comparing the face of the person with pre-stored faces of persons on the basis of face recognition. Upon detection of the name of the person, the detected name may be displayed as text. For example, text of "John" can be generated.

Extraction of text from sound may be performed in the following manner. For example, sound of "Happy birthday to you" may be included in a specific point or section of the video content. The controller 180 may analyze the sound included in the video content. The controller 180 may extract text from the sound on the basis of an analysis result.

The controller 180 may display the extracted text in step S50. For example, the controller 180 can display text "three people", "John" and "Happy birthday to you" on the display 151. The extracted text may be displayed in a region where an event corresponding to the text is generated. For example, the text can be displayed in a region where the event related to the text is generated on the basis of the progress bar of the video content.

The controller 180 may edit the video content on the basis of the displayed text in step S60.

The controller 180 may edit the video content on the basis of the displayed text. For example, a portion in which "John" appears may range from 3 minutes to 5 minutes in 10-minute video content. The controller 180 can selectively store only the portion ranging from 3 minutes to 5 minutes according to a control signal of the controller 180 or user's choice.

FIGS. 4 to 7 illustrate the operation of the mobile terminal shown in FIG. 3.

As shown, the controller 180 of the mobile terminal 100 according to an embodiment of the present invention may display text based on an image and/or sound included in video content.

Referring to FIG. 4(a), the display 151 may display video content C. The video content C may include various images and/or sound.

The controller 180 may display a progress bar PB corresponding to the video content C on the display 151. For example, the progress bar PB corresponding to the duration of the video content C can be displayed on the display 151.

The controller 180 may display at least one selection button B. The selection button B may be a button through which user input for selecting a source to be analyzed is applied. For example, the selection button B may include a first button B1 for analysis of sound, a second button B2 for analysis of action and a third button B3 for identification of person.

Upon selection of the first button B1, the controller 180 may analyze sound included in the video content C. For example, the controller 180 can analyze sound of a video clip corresponding to a specific point or period.

Upon selection of the second button B2, the controller 180 may analyze an action of an object included in the video content C. For example, the controller 180 can analyze passing of a vehicle, capturing of a person or capturing of a building at a specific point or in a specific period.

Upon selection of the third button B3, the controller 180 may analyze a person included in the video content C. For example, the controller 180 can identify a person captured at a specific point or in a specific period. The controller 180 may extract information about the name of the captured person through face recognition of the person, for example.

Referring to FIG. 4(*b*), a user may select the second button B2 for analysis of an action of an object included in the video content C using a finger F.

Referring to FIG. 5(*a*), upon selection of the second button B2, the controller 180 may analyze the video content C and display a specific event as text. That is, the controller 180 may display texts AW regarding specific actions on the progress bar PB. For example, the texts AW may be information about actions of persons included in the video content C, such as "walk", "watch" and the like.

The controller 180 may display the texts at the time when the corresponding actions are performed. For example, the controller 180 can display, on the progress bar PB, the texts AW at points at which the actions are performed.

Referring to FIG. 5(*b*), the user may select at least one of the displayed texts AWs with a finger F. For example, the user can select a text AW of "talk".

Referring to FIG. 6(*a*), the controller 180 may display an extraction area AB related to the selected text AW.

The extraction area AB may indicate information about the selected text AW. For example, when the text AW of "talk" is selected, the controller 180 may indicate a period in which persons included in the video content C perform "talk" action, on the progress bar PB. The controller 180 may indicate the extraction area AB in a color, shade, size and the like different from the other portion of the progress bar PB.

Referring to FIG. 6(*b*), the user may select the extraction area AB with a finger F. The selection operation of the user may be a touch operation TD of touching the extraction area AB and moving the touch in a specific direction. For example, the user can touch the extraction area AB and drag the touch upward (TD1) or drag the touch downward (TD2). The controller 180 may perform an operation depending on the direction, size and the like of a touch operation.

Referring to FIG. 7(*a*), the user may touch the extraction area AB and drag the touch in different directions (TD1 and TD2). The controller 180 may perform different operations according to drag directions. For example, the controller 180 may store the selected extraction area AB upon input of first drag TD1 and delete the selected extraction area AB upon input of second drag TD2.

Referring to FIG. 7(*b*), the controller 180 may execute different functions according to first and second drags TD1 and TD2 in the same direction. The first and second drags TD1 and TD2 may have different lengths while being in the same direction. For example, the first drag TD1 may have a first length TR1 and the second drag TD2 may have a second length TR2. The controller 180 may execute different functions when input is less than a predetermined reference and when the input exceeds the predetermined reference. For example, the controller 180 can display the selected extraction area AB related to the text AW "talk" when the drag input is in the range of up to the first length TR1 and display an area corresponding to a larger number of texts AW when the drag input reaches the second length TR2.

Figure 10:
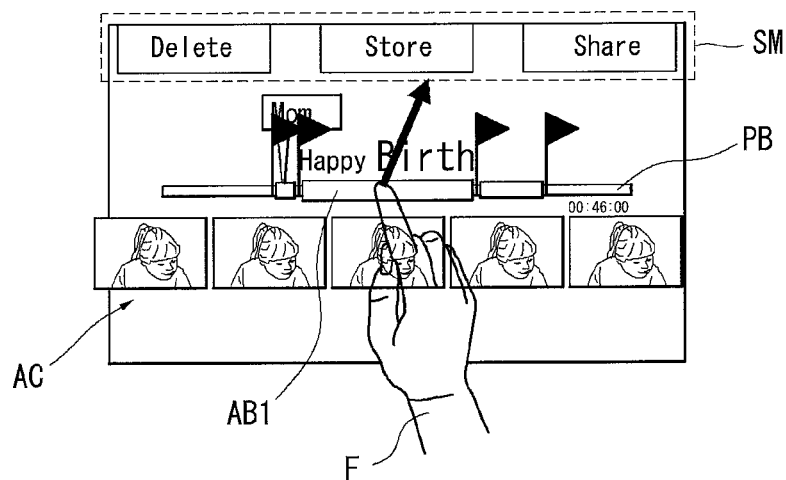

FIGS. 8 to 10 illustrate the operation of the mobile terminal, shown in FIG. 3, according to another embodiment of the present invention.

As shown, the controller 180 of the mobile terminal 100 according to another embodiment of the present invention may display a text included in video content and control the range of the displayed text in response to user input.

Referring to FIG. 8(*a*), the user may touch a specific point of the progress bar PB.

The controller 180 may display a first image C1 corresponding to the touched point in the video content. For example, the controller 180 may display a thumbnail image of a portion of the video content, which corresponds to the point of the progress bar PB, touched by the user.

The controller 180 may display first text EW1 related to the touched point. For example, sound included in the portion of the video content, which corresponds to the selected extraction area AB related to the touched point of the progress bar PB, may be "Happy Birthday". The controller 180 may analyze the sound included in the video content and display the sound as text.

The controller 180 may display a portion of the first text EW1 corresponding to the selected extraction area AB, which is close to the touched point, in a different manner. For example, when "Birth" is close to the point touched by the finger F, "Birth" can be displayed larger and/or thicker than other portions of the first text EW1.

Referring to FIG. 8(*b*), the user may drag the aforementioned touch. For example, the user can drag the initial touch on the progress bar PB downward by a first distance DR1.

When the progress bar PB is touched, the controller 180 may display the selected extraction area AB, as described above. The selected extraction area AB may be displayed differently from the other portion of the progress bar PB.

The controller 180 may display flags FL for distinctly indicating the start and end of the selected extraction area AB. For example, the controller 180 can display flags FL having the same color and/or the same shape at the start point and the end point of the selected extraction area AB. When the flags FL are displayed, the user can clearly recognize the start and end points of the extraction area related to the displayed first text EW1.

The controller 180 may perform an operation corresponding to the drag by the first distance DR1, performed by the user with the finger F. For example, upon input of the drag by the first distance DR1, the controller 180 may display an image around the selected extraction area AB. That is, the controller 180 may display second and third images C2 and C3 before and after the selected extraction area AB in addition to the first image C1 corresponding to the selected extraction area AB.

Referring to FIG. 9(*a*), the user may perform a drag operation by a second distance DR2 exceeding the first distance DR1 using a finger F. When the drag distance increases, the controller 180 may perform a different operation.

The controller 180 may display the first, second and third images C1, C2 and C3 when the length of the drag using the finger F corresponds to the first distance DR1 and display fourth and fifth images C4 and C5 in addition to the first, second and third images C1, C2 and C3 when the length of the drag increases to the second distance DR2.

The controller 180 may increase the range of the selected text as the number of displayed images increases. For example, while the controller 180 extracts the sound "Happy Birthday" corresponding to the first selected area AB1 and display the sound as text upon input of drag by the first distance DR1, the controller 180 can extract sound "Morn" and "I love you" corresponding to second and third selected areas AB2 and AB3 adjacent to the first selected area AB1 and display the sound as text upon input of drag by the second distance DR2.

Referring to FIG. 9(b), the user may select a specific image from representative images AC with a finger F. For example, the user can select the first image C1.

The controller 180 may change at least one of the size, color and thickness of the text corresponding to the selected image. For example, upon selection of the first image C1, the controller 180 can display the text "Birth" corresponding to the sound of the first image C1 larger and thicker than other texts.

Referring to FIG. 10, the user may select the first extraction area AB1. For example, the user can touch the first extraction area AB1 with a finger F. Upon selection of the first extraction area AB1, the controller 180 may display a selection menu SM. The selection menu SM may be a hidden menu which is not usually displayed but is displayed by specific user manipulation.

The user may touch the first extraction area AB1 and drag the touch to a specific item of the selection menu SM. The controller 180 may execute a function related to the item of the selection menu SM, which corresponds to the end point of the touch operation of the user.

Figure 11:
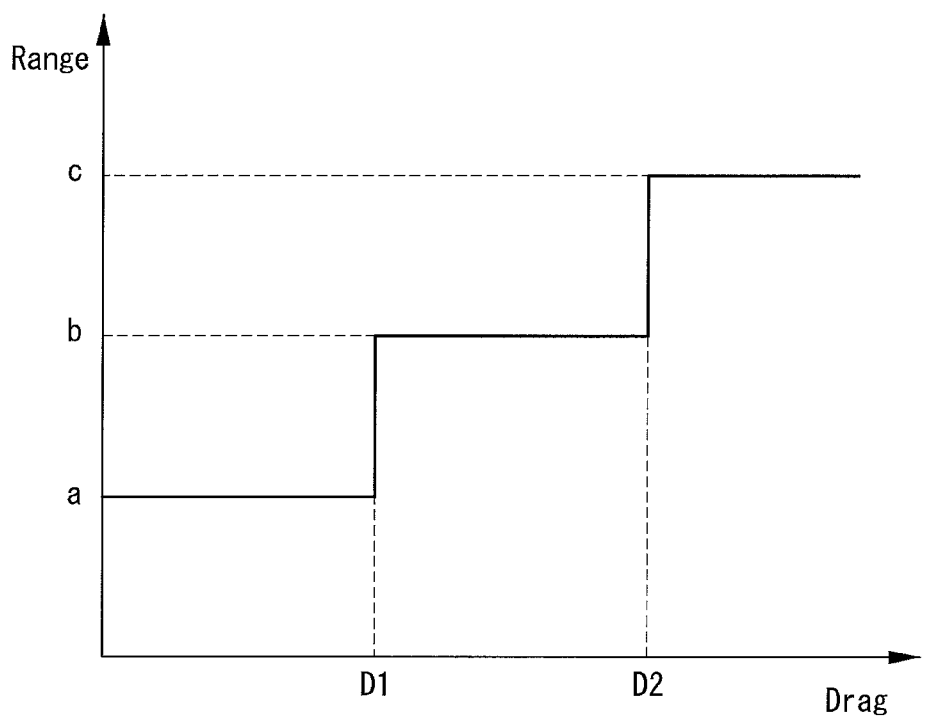

Referring to FIG. 11, drag distance may be proportional to text extraction and display range. The horizontal axis of the graph shown in FIG. 11 represents the drag distance and the vertical axis represents the text extraction and display range.

The user may increase a distance of drag of a touch applied to a specific point. The controller 180 may initially increase a text extraction range to a, to b when the drag distance reaches D1 and to c when the drag distance reaches D2. That is, the controller can gradually increase the text extraction range according to drag distance.

FIGS. 12 and 13 illustrate the operation of the mobile terminal shown in FIG. 3, according to another embodiment of the present invention.

As shown, the controller 180 of the mobile terminal 100 according to another embodiment of the present invention may select a specific portion of the video content through the progress bar PB and perform a specific operation regarding the selected portion.

Referring to FIG. 12(a), the user may touch a point of the progress bar PB. The controller 180 may display a representative image AC corresponding to the touched point of the progress bar PB. When the user drags and moves a finger F on the progress bar PB, the controller 180 may display another representative image AC corresponding to a point at which the finger F of the user arrives.

Referring to FIG. 12(b), the user may stop horizontal motion of the finger F at a specific point on the progress bar PB.

Referring to FIG. 12(c), the user may drag the finger F downward from the specific point. Upon start of the downward drag, the controller 180 may display a portion related to the representative image AC corresponding to the specific point as the extraction area AB. First and second flags FLs may be respectively displayed on the start and end points of the extraction area AB.

Referring to FIG. 13(a), the controller 180 may perform a control operation according to drag distance increase. The user may continuously drag the finger F in a specific direction. For example, the drag distance can be gradually increased to first, second and third distances DR1, DR2 and DR3, for example.

The controller 180 may control the extraction area AB to increase as the drag distance increases. For example, the controller 180 can display the first extraction area AB1 when the drag distance corresponds to the first distance DR1, display the second and third extraction areas AB2 and AB3 when the drag distance increases to the second distance DR2 and display fourth and fifth extraction areas AB4 and AB5 when the drag distance increases to the third distance DR3.

The controller 180 may display first to sixth flags FL1 to FL6 to clearly indicate the boundaries of the extraction areas AB1 to AB5.

Images and/or sound included in the video content, which respectively correspond to the extraction areas AB1 to AB5, may have different attributes. For example, each extraction area AB may correspond to an independent text. That is, the first extraction area AB1 can be one text and the second and third extraction areas AB2 and AB3 can be different texts. The controller 180 may display corresponding extracted texts around the extraction areas AB1 to AB5.

The extraction areas AB1 to AB5 may be sections in which different events are generated. For example, each extraction area AB can be discriminated on the basis of a point at which a new person appears, a person disappears, a vehicle passes or the like in the video content.

Referring to FIG. 13(b), the user may select at least one of the first to sixth flags FL1 to FL6 with a finger F. Upon selection of at least one of the first to sixth flags FL1 to FL6, the controller 180 may display a function corresponding to the selected flag. For example, when the second flag FL2 is selected, the controller 180 may display a selection menu SM through which the first extraction area AB1 corresponding to the second flag FL2 can be deleted, stored and shared.

Figure 16:
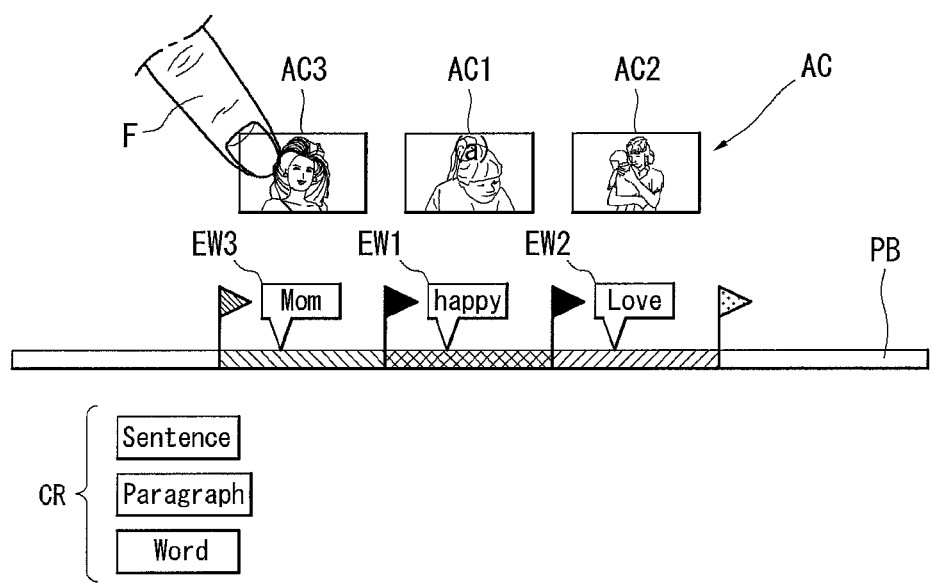

FIGS. 14 to 16 illustrate the operation of the mobile terminal shown in FIG. 3, according to another embodiment of the present invention.

As shown, the controller 180 of the mobile terminal 100 according to an embodiment of the present invention may extract a text included in video content on the basis of a predetermined criterion.

Referring to FIG. 14(a), the controller 180 may display the progress bar PB corresponding to selected video content on the display 151. The controller may display criterion unit buttons CR by which a text extraction criterion can be selected. For example, a text can be extracted on a sentence, paragraph or word basis through the criterion unit buttons CR. The user may select a specific criterion unit button CR. For example, the user can select a button for text extraction on a word basis. A case in which text is extracted on a word basis will now be described as an example.

Referring to FIG. 14(b), upon selection of a word unit, the controller 180 may extract and display a text corresponding to a selected specific point of the video content on a word basis. The user may select a specific point of the progress bar PB with a finger F. Upon selection of the specific point of the progress bar PB, the controller may detect sound included in the video content, which corresponds to the specific point. For example, sound "happy" may be included in a predetermined range on the basis of the selected point. The controller 180 may extract the sound "happy" and display the sound as a first text EW1. The controller 180 may display the portion corresponding to the sound "happy" as a first extraction area AB1. The controller 180 may display a first representative image AC1 of the first extraction area AB1.

Referring to FIG. 15(a), the user may drag the finger F downward by a first distance DR1.

Referring to FIG. 15(b), upon downward drag of the finger F by the first distance DR1, the controller 180 may increase the range of text extraction to areas around the first extraction area AB1. For example, the controller 180 can widen the text extraction area to second and third extraction areas AB2 and AB3 before and after the first extraction area AB1. The controller 180 may extract texts corresponding to the second and third extraction areas AB2 and AB3 in the same manner as the manner of extracting the text corresponding to the first extraction area AB1. The controller 180 may display the extracted texts as second and third texts EW2 and EW3.

The controller 180 may display second and third representative images AC2 and AC3 respectively corresponding to the second and third extraction areas AB2 and AB3. That is, the controller 180 can respectively extract thumbnail images from video clips corresponding to the second and third extraction areas AB2 and AB3 and display the thumbnail images.

When the user further drags the finger F by a second distance DR2, the text extraction range may increase over the second and third extraction areas AB2 and AB3.

Referring to FIG. 16, the user may select at least one of the displayed representative images AC1, AC2 and AC3. For example, the user can select the third representative image AC3. The controller 180 may display the third text EW3 corresponding to the selected third representative image AC3 differently from other texts. For example, the controller 180 can display the third text EW3 in an increased font size or in bold type. That is, upon selection of one of an image and a text, display of another corresponding to the selected one may be changed.

FIG. 17 illustrates the operation of the mobile terminal shown in FIG. 3, according to another embodiment of the present invention.

As shown, the controller 180 of the mobile terminal 100 according to another embodiment of the present invention may extract and display a text even when video content includes only images.

Referring to FIG. 17(a), the controller 180 may extract a first text EW1 and a first image AC1 from a first extraction area AB1 around a specific point selected by the user and display the first text EW1 and the first image AC1.

Referring to FIG. 17(b), an extraction area may be extended by manipulation of the user and/or the controller 180. For example, the extraction area can be extended to the second and/or third extraction areas AB2 and AB3 adjacent to the first extraction area AB1.

The first and second extraction areas AB1 and AB2 may include sound along with images. The controller 180 may extract the first and second texts EW1 and EW2 on the basis of sound included in the video content. The controller 180 may display the first and second representative images AC1 and AC2 on the basis of images included in the video content.

The third extraction area AB3 may include images only. The controller 180 may analyze images with respect to the third extraction area AB3. That is, the controller 180 may extract text through analysis of characteristic situations regarding the images. For example, the controller 180 can extract and display a third text EW3 of "party" through analysis of an image corresponding to the third extraction area AB3.

FIGS. 18 and 19 illustrate the operation of the mobile terminal according to another embodiment of the present invention.

As shown, the controller 180 of the mobile terminal 100 according to another embodiment of the present invention may display information about a captured person in various manners through analysis of video content.

Referring to FIG. 18(a), the controller 180 may analyze persons included in the first, second and third extraction areas AB1, AB2 and AB3 in the video content. For example, the controller 180 can extract the names of persons included in the video content by comparing face recognition information extracted from the persons included in the video content with pre-stored information. The controller 180 may display text information about a captured person corresponding to a specific area. For example, the controller 180 can indicate that John and Suji are captured in the third extraction area AB3, John is captured in the first extraction area AB1 and John, Tom and Suji are captured in the second extraction area AB2 by means of the names PN1 thereof.

Referring to FIG. 18(b), the controller 180 may determine how many persons are included in video clips corresponding to the first, second and third extraction areas AB1, AB2 and AB3. For example, the controller 180 can determine that two persons are included in the first extraction area AB1 through image analysis. Upon determining the number of persons, the controller 180 may display the number of persons corresponding to the first, second and third extraction areas AB1, AB2 and AB3 as numbers.

Referring to FIG. 19(a), the controller 180 may display identification information AP of persons included in the video content. The identification information AP may be the name of a person included in the video content.

The controller 180 may display the identification information AP at a point where a person corresponding to the identification information AP is captured. That is, the controller 180 can display the identification information AP on the basis of the point at which the corresponding person is initially captured. Accordingly, the user can easily recognize that John was captured prior to Tom through the displayed identification information AP.

The controller 180 may display the identification information AP on the basis of importance such as the frequency, capture time or the like with respect to the corresponding captured person. That is, at least one of the size, thickness and font of a text with respect to a person who is frequently captured can be different from texts with respect to other persons. For example, the user can intuitively recognize that John was captured as a person regarded as a relatively important through the identification information AP.

Referring to FIG. 19(b), the user may select a specific person with a finger F. For example, the user can select John. Upon selection of the specific person, the controller 180 may display an area SR of the video content, which corresponds to the selected person.

Figure 20:
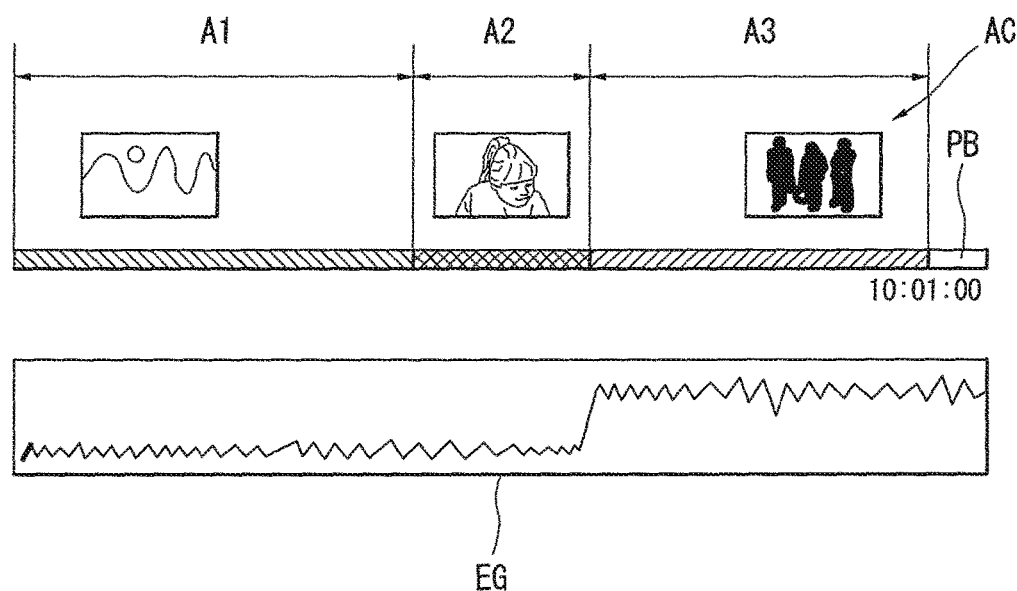
FIG. 20 illustrates the operation of the mobile terminal shown in FIG. 3, according to another embodiment of the present invention.

FIG. 20 illustrates the operation of the mobile terminal shown in FIG. 3, according to another embodiment of the present invention.

As shown, the controller 180 of the mobile terminal 100 according to another embodiment of the present invention may set an area through analysis of an image and/or sound of video content.

The controller 180 may acquire analysis data EG through analysis of an image and/or sound of the video content. For example, the analysis data EG may represent variation in sound included in the video content. That is, the analysis data EG may be data obtained by analyzing variation in sound with time. For example, the analysis data EG may represent a change in an image included in the video content. That is, the analysis data EG may be data obtained by analyzing variation in a person included in an image, image shaking, change in the color and brightness of an image, weather change in an image, place change in an image, or the like.

The controller 180 may divide the video content into at least two areas through analysis of images and/or sound of the video content. For example, a first area A1 may be an area including captured scenery and a second area A2 may be an area including one captured person. The controller 180 may display the first area A1 and the second area A2 in a discriminating manner on the basis of a difference between the images corresponding thereto, that is, the scenery and the person. A third area A3 may be an area including a plurality of captured persons and relatively loud sound. The controller 180 may display the second area A2 and the third area A3 differently according to the number of persons and/or sound.

Figure 21:
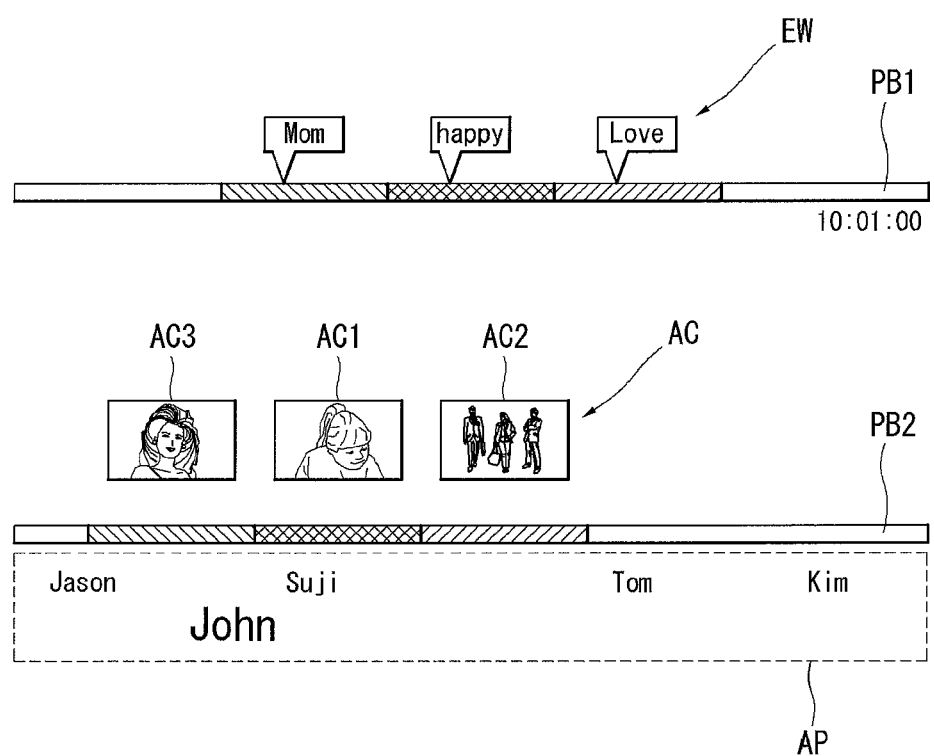
FIG. 21 illustrates the operation of the mobile terminal shown in FIG. 3, according to another embodiment of the present invention.

FIG. 21 illustrates the operation of the mobile terminal shown in FIG. 3 according to another embodiment of the present invention.

As shown, the controller 180 of the mobile terminal 100 according to the present invention may separately display audio and video parts of video content.

The controller 180 may display first and second progress bars PB1 and PB2. The first progress part corresponds to the audio part of the video content and the second progress bar PB corresponds to the video part of the video content. The controller 180 may display texts EW extracted from the audio part of the video content, representative images AC extracted from the video part of the video content and/or the identification information AP on specific points of at least one of the first and second progress bars PB1 and PB2.

The video content may be edited according to a control signal of the controller 180 and/or choice of the user. For example, a portion of the video content, which includes "John", and a portion of the video content, which includes a word "Love", can be selectively combined.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touchscreen configured to display a first object, a second touchscreen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touchscreen, displaying a second object on the second touchscreen, receiving a first touch input applied to the first object, and linking the first object to a function corresponding to the second object when a second touch input applied to the second object is received while the first touch input is maintained.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display; and
a microprocessor configured to:
    display video content and a progress bar related to the video content on the display,
    receive a touch input for selecting a point of the progress bar,
    analyze a sound included in the video content related to the touched point and display the sound as text in a first region adjacent to the progress bar,
    display an extraction area including the touched point on the progress bar, wherein the extraction area indicates information about the text,
    display an image corresponding to the extraction area in the video content in a second region adjacent to the progress bar,
    change at least one of a range and a number of the extraction area according to a drag length in a downward direction of the touch input,
        wherein the extraction area includes a first extraction area including the touched point, a second extraction area adjacent to the first extraction area, and a third extraction area adjacent to the second extraction area,
    increase the at least one of the range and the number of the extraction area in order of the first, second and third extraction areas according to an increase of the drag length in a downward direction of the touch input, and
    increase at least one of a range and a number of the text corresponding to the extraction area and a number of the image corresponding to the extraction area.

2. The mobile terminal of claim 1, wherein the microprocessor is configured to display at least one icon for indicating start and end points of each of the extraction areas at the start and end points.

3. The mobile terminal of claim 1, wherein the microprocessor is configured to extract a plurality of texts from the video content,
    wherein the microprocessor is configured to differently display one of positions, sizes and thicknesses for the plurality of texts.

4. The mobile terminal of claim 3, wherein the microprocessor is configured to determine at least one of the positions, the sizes and the thicknesses for the plurality of texts based on frequency of the text.

5. A method for controlling a mobile terminal, comprising:
displaying video content and a progress bar related to the video content on a display;
receiving a touch input for selecting a point of the progress bar,
analyzing a sound included in the video content related to the touched point and displaying the sound as text in a first region adjacent to the progress bar,
displaying an extraction area including the touched point on the progress bar, wherein the extraction area indicates information about the text,
displaying an image corresponding to the extraction area in the video content in a second region adjacent to the progress bar,
changing at least one of a range and a number of the extraction area according to a drag length in a downward direction of the touch input,
wherein the extraction area includes a first extraction area including the touched point, a second extraction area adjacent to the first extraction area, and a third extraction area adjacent to the second extraction area,
increasing the at least one of the range and the number of the extraction area in order of the first, second and third extraction areas according to an increase of the drag length in a downward direction of the touch input, and
increasing at least one of a range and a number of the text corresponding to the extraction area and a number of the image corresponding to the extraction area.

6. The method of claim 5, further comprising displaying at least one icon for indicating start and end points of each of the extraction areas at the start and end points.

7. The method of claim 5, comprising extracting a plurality of texts, and
differently displaying one of positions, sizes and thicknesses for the plurality of texts.

8. The method of claim 5, further comprising extracting, from the video content, at least one image related to the text and displaying the at least one image.

* * * * *